(12) United States Patent
Gomez (10) Patent No.: US 11,498,743 B2
(45) Date of Patent: Nov. 15, 2022

(54) CARDBOARD CONTAINER FOR ACTIVE PACKAGING OF FRESH FRUIT AND VEGETABLES AND PRODUCTION METHOD OF SAME

(71) Applicant: Universidad Politecnica de Cartagena, Cartagena (ES)

(72) Inventor: Antonio Lopez Gomez, Cartagena (ES)

(73) Assignee: Universidad Politecnica de Cartagena, Cartagena (ES)

( * ) Notice: Subject to any disclaimer, the term of this patent is extended or adjusted under 35 U.S.C. 154(b) by 335 days.

(21) Appl. No.: 16/092,381

(22) PCT Filed: Mar. 22, 2017

(86) PCT No.: PCT/ES2017/070169
§ 371 (c)(1),
(2) Date: Oct. 9, 2018

(87) PCT Pub. No.: WO2017/178675
PCT Pub. Date: Oct. 19, 2017

(65) Prior Publication Data
US 2019/0092550 A1    Mar. 28, 2019

(30) Foreign Application Priority Data

Apr. 15, 2016    (ES) ............................... ES201630472

(51) Int. Cl.
*B65D 81/28*     (2006.01)
*A01N 25/10*     (2006.01)
(Continued)

(52) U.S. Cl.
CPC ............. *B65D 81/28* (2013.01); *A01N 25/10* (2013.01); *A01N 43/16* (2013.01); *A01N 65/00* (2013.01);
(Continued)

(58) Field of Classification Search
CPC .......... B65D 81/28; B65D 21/08; B65D 6/28; B65D 85/72; A01N 25/10; A01N 43/16;
(Continued)

(56) References Cited

U.S. PATENT DOCUMENTS 3,853,221 A * 12/1974 Boyd ....................... B65D 1/36
206/523
4,722,474 A *  2/1988 Dropsy .................. B65D 5/003
229/125.35
(Continued)

FOREIGN PATENT DOCUMENTS

EP        0514578 A1    11/1992
ES        2393388 A1    12/2012
(Continued)

OTHER PUBLICATIONS

Deshmukh, K., Ahamed, M. B., Deshmukh, R. R., Pasha, S. K. K., Bhagat, P. R., Chidambaram, K. (Sep. 16, 2016). Biopolymer composites with high dielectric performance: Interface Engineering. Biopolymer Composites in Electronics. (Chapter 2.1.6).*
(Continued)

*Primary Examiner* — Rafael A Ortiz
*Assistant Examiner* — Sanjidul Islam
(74) *Attorney, Agent, or Firm* — Locke Lord LLP; Nicholas J. DiCeglie, Jr.

(57) ABSTRACT

This invention is, in general, related to the technological field of packaging of vegetable products, such as whole fresh fruits and vegetables that tend to have certain surface microbial load. Specifically, this invention relates to a new cardboard packaging which is characterised by having an antimicrobial active coating based on a polymeric compound in combination with essential oils forming inclusion complexes with cyclodextrins. Vapours of essential oils are emitted from the cardboard as sufficiently high relative
(Continued)

humidities are reached in the vicinity of this coating which is next to the packed product, and these vapours have an antimicrobial action against fungi, yeasts and bacteria, which both spoil product quality and are pathogenic for consumers. This new packaging significantly achieves increasing food safety and the shelf life of foods packed therein.

18 Claims, 7 Drawing Sheets

(51) Int. Cl.
| | |
|---|---|
| *A01N 43/16* | (2006.01) |
| *A01N 65/00* | (2009.01) |
| *A23B 7/154* | (2006.01) |
| *B65B 11/00* | (2006.01) |
| *B65B 25/04* | (2006.01) |

(52) U.S. Cl.
CPC ............ *A23B 7/154* (2013.01); *B65B 11/004* (2013.01); *B65B 25/041* (2013.01); *B65B 25/046* (2013.01); *A23V 2002/00* (2013.01); *Y02A 40/90* (2018.01); *Y02W 90/10* (2015.05)

(58) Field of Classification Search
CPC ....... A01N 65/00; A23B 7/154; B65B 11/004; B65B 25/041; B65B 25/046; B65B 25/02; B65B 25/04
USPC ....................................................... 220/4.03
See application file for complete search history.

(56) References Cited

U.S. PATENT DOCUMENTS

| | | | | |
|---|---|---|---|---|
| 5,539,035 A * | 7/1996 | Fuller | ...................... | C08K 5/09 524/300 |
| 5,556,658 A * | 9/1996 | Raudalus | ............. | B65D 77/062 426/124 |
| 5,660,900 A * | 8/1997 | Andersen | ................ | B28B 11/24 428/35.6 |
| 5,830,548 A * | 11/1998 | Andersen | ................ | B32B 27/20 428/36.4 |
| 6,143,113 A * | 11/2000 | Berube | ................... | B32B 29/08 156/210 |
| 9,120,916 B1* | 9/2015 | Swarup | ............. | C08G 18/6229 |
| 9,243,162 B1* | 1/2016 | Agrawal | ............. | C09D 191/08 |
| 9,539,757 B2* | 1/2017 | Ramirez | ................ | B65D 85/34 |
| 9,809,377 B2* | 11/2017 | Adam | ................... | B65B 31/043 |
| 2004/0031716 A1* | 2/2004 | Slaughter | ............... | B65D 81/02 206/521.1 |
| 2004/0094279 A1* | 5/2004 | Myatt | .................... | D21H 19/38 162/135 |
| 2005/0014013 A1* | 1/2005 | Daniels | .................. | D21H 19/20 428/507 |
| 2006/0235127 A1* | 10/2006 | Moad | ...................... | C08L 23/10 524/444 |
| 2007/0208125 A1* | 9/2007 | Cantu-Gonzalez | .... | D21H 19/58 524/487 |
| 2008/0110880 A1* | 5/2008 | Orgeldinger | ......... | B65D 21/083 220/4.03 |
| 2011/0253562 A1* | 10/2011 | Machado | ............... | B65D 81/28 206/213.1 |
| 2012/0107459 A1* | 5/2012 | Wood | ..................... | C09D 105/16 426/106 |
| 2012/0125799 A1* | 5/2012 | Doreau | .............. | C08G 18/4238 206/524.3 |
| 2016/0168799 A1* | 6/2016 | Constant | ................ | D21H 19/22 428/34.2 |
| 2016/0198704 A1* | 7/2016 | Wood | ..................... | A01N 43/16 426/106 |

FOREIGN PATENT DOCUMENTS

| | | |
|---|---|---|
| JP | S61108359 A | 5/1986 |
| WO | WO-2008149232 A2 * | 12/2008 ............. A23B 7/154 |

OTHER PUBLICATIONS

International Search Report issued in PCT/ES2017/070169, dated Jun. 2, 2017.

* cited by examiner

CARDBOARD CONTAINER FOR ACTIVE PACKAGING OF FRESH FRUIT AND VEGETABLES AND PRODUCTION METHOD OF SAME

CROSS REFERENCE TO RELATED APPLICATIONS

This Application is a 35 U.S.C. § 371 National Phase Application of International PCT Patent Application No. PCT/ES2017/070169, filed on Mar. 22, 2017, which claims the benefit of and priority to Spanish Patent Application Serial No. P201630472, filed Apr. 15, 2016, the entire contents of each of which are hereby incorporated by reference herein in their entirety.

FIELD OF THE INVENTION

This invention is related to the technological field of packaging of vegetable products, such as whole fresh fruits and vegetables that tend to have certain surface microbial load. Specifically, this invention relates to a new cardboard packaging which is characterised by having an antimicrobial active coating based on a polymeric compound in combination with essential oils that form inclusion complexes with cyclodextrins. Vapours of essential oils are emitted from the packaging as sufficiently high relative humidities are reached in the vicinity of this coating, which is next to the packed product. These vapours have an antimicrobial action against fungi, yeasts and bacteria, which both spoil product quality and are pathogenic for consumers. This new packaging significantly achieves increasing food safety and the shelf life of foods packed therein.

BACKGROUND OF THE INVENTION

In recent years there is a very strong tendency to use packagings that are biodegradable, so as to reduce the environmental impact as far as possible. This is one of the reasons for the increased use of the micro-corrugated or corrugated cardboard packaging. Furthermore, corrugated cardboard, which can be of the single wall (double face), double wall, and triple-wall types, and with large flute, medium flute, small flute and micro-flute (also referred to as micro-corrugated cardboard), has mechanical properties which are well suited to the packagings needed in the packaging of fresh fruits and vegetables. Indeed, cardboard boxes are used for bulk packaging of these fresh products, using boxes of different types and designs, such as, for example, the format types included in the Standard UNE 137005:2005. For packaging of small quantities (usually less than 1 kg) of fruits and vegetables the cardboard boxes can be made of micro-corrugated cardboard or of another type. In these applications cardboard boxes can be wrapped totally or partially with a sheet of polymer material, applied according to the known flow-pack system or simply as a cover over the top of the box. In the full flow-pack wrap format, typically, boxes or trays of micro-corrugated cardboard are used and are employed in the packaging of small quantities of tomatoes and other vegetables, and fruits such as kiwis, grapes, cherries, apricots, among others.

However, the usual procedures of packaging these fresh fruits and vegetables, which involve the simple non-active use of these cardboard boxes, in different formats, in combination with the refrigerated preservation at temperatures close to 1° C., may result in:

food safety problems, due to the presence of pathogenic microorganism in the cardboard packaging (as evidenced by the scientific work of Brandwein, M., Al-Quntar, A., Goldberg, H., Mosheyev, G., Goffer, M., Marin-Iniesta, F., López-Gómez, A., and Steinberg, D. (2016), "Mitigation of Biofilm Formation on Corrugated Cardboard Fresh Produce Packaging Surfaces Using a Novel Thiazolidinedione Derivative Integrated in Acrylic Emulsion Polymers", Frontiers in microbiology, 7.), and problems with the shelf life of the product, which can be relatively reduced.

This is the reason why various active packaging solutions have been proposed to extend the shelf life of these fruits and vegetables.

Some of these solutions for active packaging for fresh fruits and vegetables are those provided in the following documents:

WO2011081877 entitled "MATURATION OR RIPENING INHIBITOR RELEASE FROM POLYMER, FIBER, FILM, SHEET OR PACKAGING", which relates to compositions of thermoplastic polyolefins, polymers, fibres, fabrics, films, seals, and laminates including a polymer and cyclodextrin compound with a maturation inhibitor which is volatile. The inhibitor is introduced into those packaging materials and is released under controlled conditions of humidity. With this packaging solution the process of deterioration of the packed fruits and vegetables could be controlled. However, this proposal does not relate to cardboard packaging, and what it proposes is a packaging material that releases ethylene inhibiting substances instead of antimicrobial substances.

ES 2393388 B1, entitled "ACTIVE PACKAGING FOR FRESH VEGETABLE PRODUCT PRESERVATION", which relates to an active packaging for preserving fresh vegetable products and is characterised in that it provides ethylene adsorption, water vapour control, and antimicrobial properties. This active packaging comprises a container of biodegradable material such as cardboard, coated on its inner surface with an ethylene and water vapour absorbing biopolymer sheet, such as polylactic acid (designated PLA), in which natural essential oils with antimicrobial action, but not encapsulated in cyclodextrins, are added.

ES2289930, entitled "FOOD PATHOGEN INHIBITOR ACTIVE PACKAGING", which consists of an antimicrobial active packaging comprising a paper, cardboard, cork, aluminium, or wood base, and an active coating thereof, said coating consisting of a paraffin and natural plant extract formulation, but not encapsulated in cyclodextrins.

In these last two documents, from the time the packaging or corresponding packaging material is manufactured, the antimicrobial substances described (essential oils or plant extracts with proven antimicrobial activity, as is explained in the Spanish Patents 2393388 B1 and ES 2534529 B1) are released continuously (through evaporation), and not in a modulated manner from the time the product is packed. In addition, in these two documents, the conditions of manufacture of the cardboard material of the cardboard packaging (which involves to submit it to temperatures exceeding 100° C.) may result in the loss through evaporation of an important part of the volatile anti-microbial substances added in the cardboard coating.

On the other hand, most of the solutions described on active cardboard packagings are only related to active packagings that have only one activity, with the exception of ES2393388 B1. The aforementioned documents, for example, were mainly examples of antimicrobial packaging. Also, and by way of example, the document WO2007137565 (A1), entitled "METHOD FOR INCREASING THE SHELF LIFE OF AGRICULTURAL PRODUCTS WHICH PRODUCES ETHYLENE, DURING TRANSPORT, SALE, PRESENTATION AND/OR STORAGE", relates to an ethylene-absorbing coating or material that is applied to the cardboard, or some of its layers of paper. In this way, according to its authors, the products packed in open cardboard boxes, which include this ethylene-adsorbent substance, can achieve a longer shelf life. But, it can be experimentally verified that if the cardboard box is open, and the product that is packed in this box is not wrapped, even partially, with any sheet of polymeric material, or even paper, this cardboard-based active packaging will not be very effective in its function of controlling ethylene produced by the packed product.

On the other hand, an inclusion compound or complex is a unique form of chemical complex in which a molecule (so-called guest) is included or enclosed within another molecule (so-called host), or within an aggregation of molecules (Marques H. M. C., 2010, "A review on cyclodextrin encapsulation of essential oils and volatiles", Flavour and Fragrance Journal, 25(5), 313-326). The stereochemistry and, possibly, the polarity of the molecules, both of the host and the guest, determine if this inclusion complex may occur. In the case of cyclodextrins, which are molecules that may act as host in the formation of inclusion complexes, the main binding cause between these molecules and the guest (the different components of essential oils being so considered) is the geometric fitting between molecules, so that the formation of inclusion complexes with cyclodextrins occurs in a stereospecific way. Thus, it is possible to use the cyclodextrin ring to partially include or enclose a molecule partially blocking some reactive sites of the guest, and leaving others exposed to the environment.

Cyclodextrins can be considered as nanoencapsulation agents, since formation of the inclusion complex is equivalent to molecular encapsulation because the guest molecules are isolated from one another and molecularly dispersed in a an oligosaccharide array.

For all the above, to achieve greater thermal stability of essential oils, and in order that they do not evaporate quickly, these oils can be used by forming inclusion complexes with cyclodextrins. In this way, the authors of the present invention have surprisingly found that if essential oils are applied in the form of inclusion complexes with cyclodextrins in a coating on the cardboard, they can evaporate in a modulated way from the surface of the cardboard packaging, and only when the product is packed and forms water vapour and there is an increase of the relative humidity of the surrounding air on the surface of the cardboard.

However, although the stability of the essential oils is increased when they form inclusion complexes with cyclodextrins, the essential oils also have some volatility at certain temperatures. This can be seen in calorimetry studies using the DSC (Differential Scanning calorimetry) technique, as shown by Cevallos et al (2010) (Cevallos, P. A. P., Buera, M. P., and Elizalde, B. E. 2010. "Encapsulation of cinnamon and thyme essential oils components (cinnamaldehyde and thymol) in betacyclodextrin: effect of interaction with water on complex stability", Journal of Food Engineering, vol. 99, p. 70-75).

Figure 1:
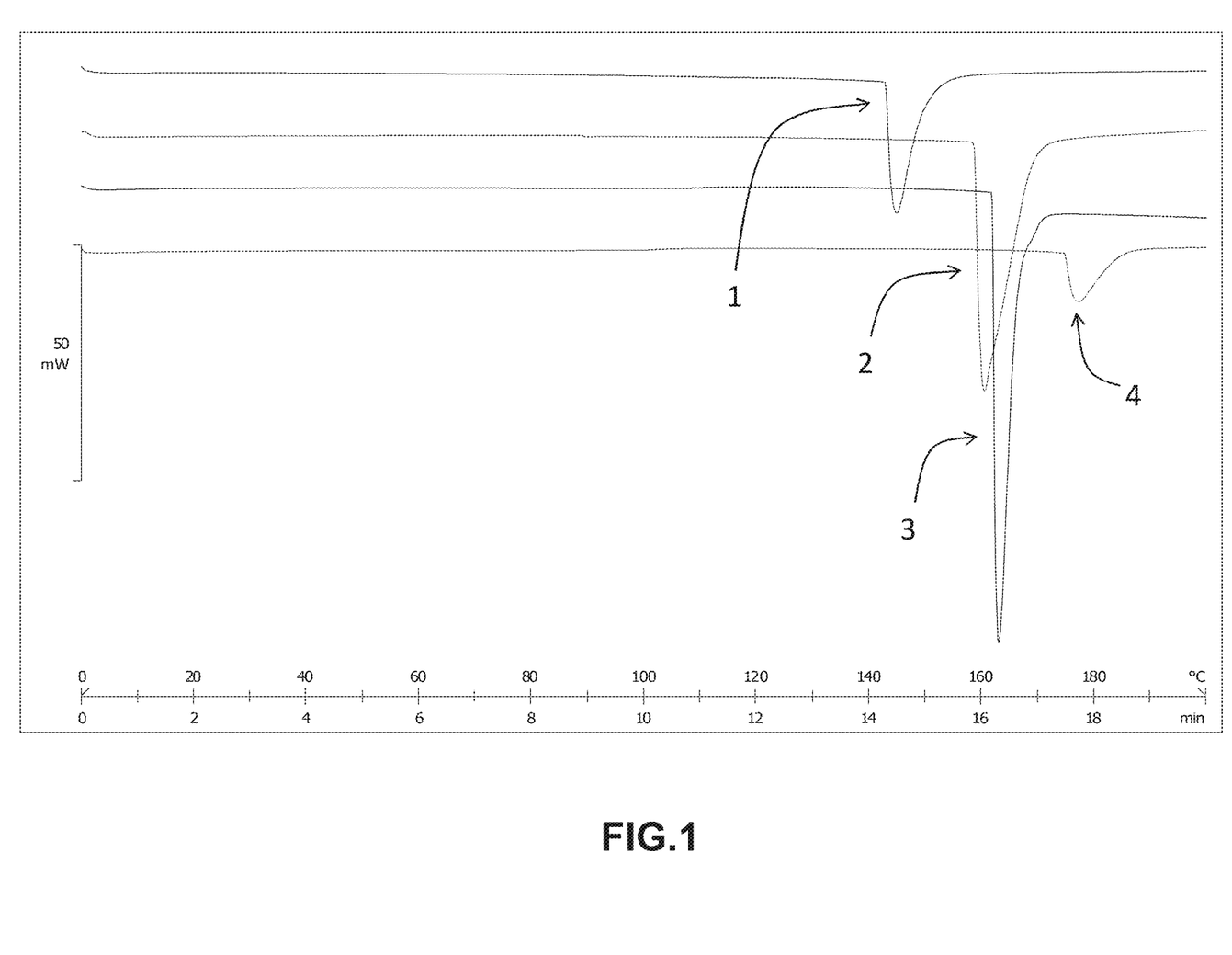
FIG. 1. Curves obtained using a DSC analysis for: a dry sample of acrylic copolymer (this polymer is normally applied in aqueous dispersion as coating for the cardboard to improve its properties of impermeability to water) (curve indicated as 1); a sample of β-cyclodextrins without forming inclusion complex (curve indicated as 2); a sample of the inclusion complex formed by essential oil, in this case thyme plus thymol, and β-cyclodextrins (curve indicated as 3); and a sample of a coating, object of this invention, made up of an acrylic copolymer plus an inclusion complex formed by essential oil (that which is shown in the graph is thyme plus thymol in the proportion 1:1 by weight) and β-cyclodextrins (curve indicated as 4). To determine these curves (and the melting temperature of each of the samples) a differential scanning calorimeter DSC model 822E from METTLER-TOLEDO has been used with the following analysis conditions: temperature ramp from 0 to 200° C. with gradient of 10° C./min, atmosphere with inert gas with a stream of N2, and 100 µL of sealed aluminium crucibles; the amount of weighed sample was about 10 mg. In these analyses the method set out in the work of Ceballos et al. (2010) has been followed with some modifications. Preparation of samples was made in the following way.

Furthermore, the authors of the invention have found that when the inclusion complex between cyclodextrins and essential oils is combined with a polymer to be applied to the cardboard, a remarkable increase in the melting temperature is achieved. For example, in FIG. 1 it is evidenced that the melting temperature of the β-CD alone is approximately 157° C. (as is inferred from the endothermic peak of the curve indicated as 2). When an inclusion complex between the β-CD and the essential oil is formed (in this case the combination of essential oil of thyme with thymol), the melting temperature increases to about 162° C. (endothermic peak of the curve indicated as 3). When this inclusion complex is also combined with an acrylic copolymer (which we call lacquer) to be applied on the cardboard, further increase of the melting temperature is achieved, reaching approximately 178° C. (endothermic peak of the curve indicated as 4), being for the lacquer alone of about 145° C. (as is inferred from the endothermic peak of the curve indicated as 1).

This is of great importance in the successful development of the invention described herein, since when the corrugated cardboard is manufactured, the coating that is applied to one of its faces must be dried (because it is water based), and it is heated to temperatures that can exceed 170° C. These temperatures can make the inclusion complex with cyclodextrins unstable and promote the loss through evaporation of the essential oil used. This would be a serious problem because essential oils achieve efficiency if there is a suitable amount of mass (mg) of essential oils per $m^2$ of cardboard (applied, at least, on one of its faces). If there is severe evaporation, more than 50% of the essential oils forming the cited inclusion complex with cyclodextrins may be lost, resulting in the antimicrobial effect becoming diminished or even disappearing. Furthermore, essential oils are often expensive, and these evaporation losses may make the use of essential oils applied on a cardboard coating as antimicrobials economically non-viable.

DESCRIPTION OF THE INVENTION

Accordingly, the main object of the present invention is a cardboard packaging for the active packaging of fresh fruits and vegetables, which is characterised in that the cardboard has, on at least one of the inner faces of the packaging, an antimicrobial active coating comprising a polymeric compound and inclusion complexes of cyclodextrins with essential oils or components of these oils or mixtures of both.

In a particular embodiment the essential oils (EOs) mentioned above can be pure essential oils derived from plants, selected from among those obtained from shoots or buds, flowers, leaves, stems, branches, seeds, fruits, roots, or wood or bark, or a mixture thereof. For example, it may be essential oil of citrus fruits, orange, lemon, mandarin, lime, grapefruit, bergamot, citronella, or of oregano, rosemary, thyme, lemon grass, cinnamon, basil, mint, dill, tree tea, clove, fennel, pepper, among many others.

As discussed above, also one of the main or non-main components of these essential oils known for their proven antimicrobial effect may be used. For example, in a particular embodiment, the useful components of essential oils in the context of the present invention are selected from among those which are terpenes or terpenoids, or aromatic or aliphatic compounds, or a mixture thereof.

Another possible embodiment considers the use of a mixture of essential oil components mentioned above with one or more pure essential oils, i.e. blends of pure essential oils may be used with or without the addition of one or more of their main components (such as for example thymol, carvacrol, among many others). Depending on each application and the type of microorganisms whose growth is wished to inhibit, a particular essential oil or a certain combination of essential oils will be appropriate, including, or not one or more of their main components (such as, for example, thymol, carvacrol, among others), as discussed in ES 2534529 B1.

The types of cyclodextrins that may be used in this invention are α,β and γ cyclodextrins (α-CD, β-CD, and γ-CD). Each one of these cyclodextrins has the characteristics shown in Table 1 below.

TABLE 1

Characteristics of cyclodextrins, of the alpha-cyclodextrin, beta-cyclodextrin and gamma-cyclodextrin types known as α-CD, β-CD, and γ-CD, respectively.

| Characteristic | α-CD | β-CD | γ-CD |
|---|---|---|---|
| Number of glucose units | 6 | 7 | 8 |
| Molecular weight (Da) | 972 | 1135 | 1297 |
| Number of water molecules in the cavity | 6 | 11 | 17 |
| Solubility in water at 25° C. (% w/v) | 14.5 | 1.85 | 23.2 |
| Half-life in 1M HCl at 60° C. (h) | 6.2 | 5.4 | 3.0 |
| Diameter of the central cavity (nm) | 0.5-0.6 | 0.6-0.8 | 0.8-1.0 |
| Outer diameter (nm) | 1.4-1.5 | 1.5-1.6 | 1.7-1.8 |
| Toroidal shape height (nm) | 0.8 | 0.8 | 0.8 |

As the inner cavity of cyclodextrins is hydrophobic, these molecules are able to host smaller hydrophobic molecules (such as molecules of the various components of the essential oils) to form "host-guest" complexes in which the guest molecule is encapsulated by the cyclodextrin. In this way, water-insoluble molecules (such as the components of essential oils) can become completely soluble by treatment with aqueous cyclodextrin solutions, without causing any chemical modification in the guest molecule, since no covalent bond occurs during the interaction between the cyclodextrin and the water-insoluble molecule, as established by the authors Martínez and Gómez (Martínez G. and Gómez, M. A., 2007, "Cyclodextrins: inclusion complexes with polymers", Revista Iberoamericana de Polimeros, volume 8, September, p. 300-312). However, once these inclusion complexes (or "host-guest" complexes) are formed, the presence of water can destabilise them and cause their decomposition. This is what happens when these (dehydrated or dry) inclusion complexes comes into contact with air with high relative humidity above 85%, as evidenced by the studies of Cevallos et al (2010). Under these conditions of relative humidity above 85% the water molecules cause the molecules of essential oils that were encapsulated in cyclodextrins to be released.

The composition and the form of application of the cardboard coating, object of this invention, prevents the essential oils from evaporating during the industrial drying of the coating applied to the cardboard, or during storage of the cardboard in air with relative low humidity (below 80%), so that they maintain their concentration in the coating until the packaging is loaded with fresh fruits and vegetables and is stored in cold stores at low temperatures (above 0° C.) and high relative humidity (above 80%). When fruits and vegetables are packed in the packaging of the invention, a high relative humidity in the air in contact with the inner surface of the cardboard box (normally above 80%) is generated, and a certain amount of water vapour is filtered through the applied coating to at least one of the inner faces of the cardboard packaging, and the release of the vapours of essential oils from said inner faces takes place (through decomposition of the inclusion complexes formed between the essential oils and the cyclodextrins). These essential oils released in vapour phase exert their antimicrobial action on the microorganisms present mainly on the surface of the fresh fruits and vegetables.

For the nanoencapsulation or preparation of the inclusion complex (as a solid complex) between the essential oil or combination of essential oils (or one of their components, or a combination of essential oils with one or more of their components) and the cyclodextrins any of the following methods can be used: kneading method, co-precipitation method (based or not based on phase solubility), heating method in a sealed vessel or container, gas (or vapour)-liquid interaction method, lyophilisation method, spraying method, or by using supercritical fluid technology (as described in detail in the article by Marques, 2010).

Another of the essential elements of the invention is the polymeric compound that is applied mixed with the inclusion complexes between cyclodextrins and essential oils on at least one inner face of the cardboard packaging of the invention. In a particular and preferred embodiment, the polymeric compound is anionic, and is an acrylic copolymer. However, in various particular embodiments of the invention, the polymeric compound used can also be a biopolymer, selected from among those which can be extracted directly from biomass (such as polysaccharides, proteins or lipids), or from among those that can be synthesized from monomers obtained from biological material (such as polylactic acid and other polyesters), or from among those that can be produced directly by microorganisms (such as polyhydroxyalkanoates. or PHA, or bacterial cellulose, or xanthan, curdlan, or pullulan), or derivatives thereof, forming, when necessary (for the preparation of aqueous emulsion), an emulsion of polymer nanocapsules in combination with an anionic surfactant.

Figure 3:
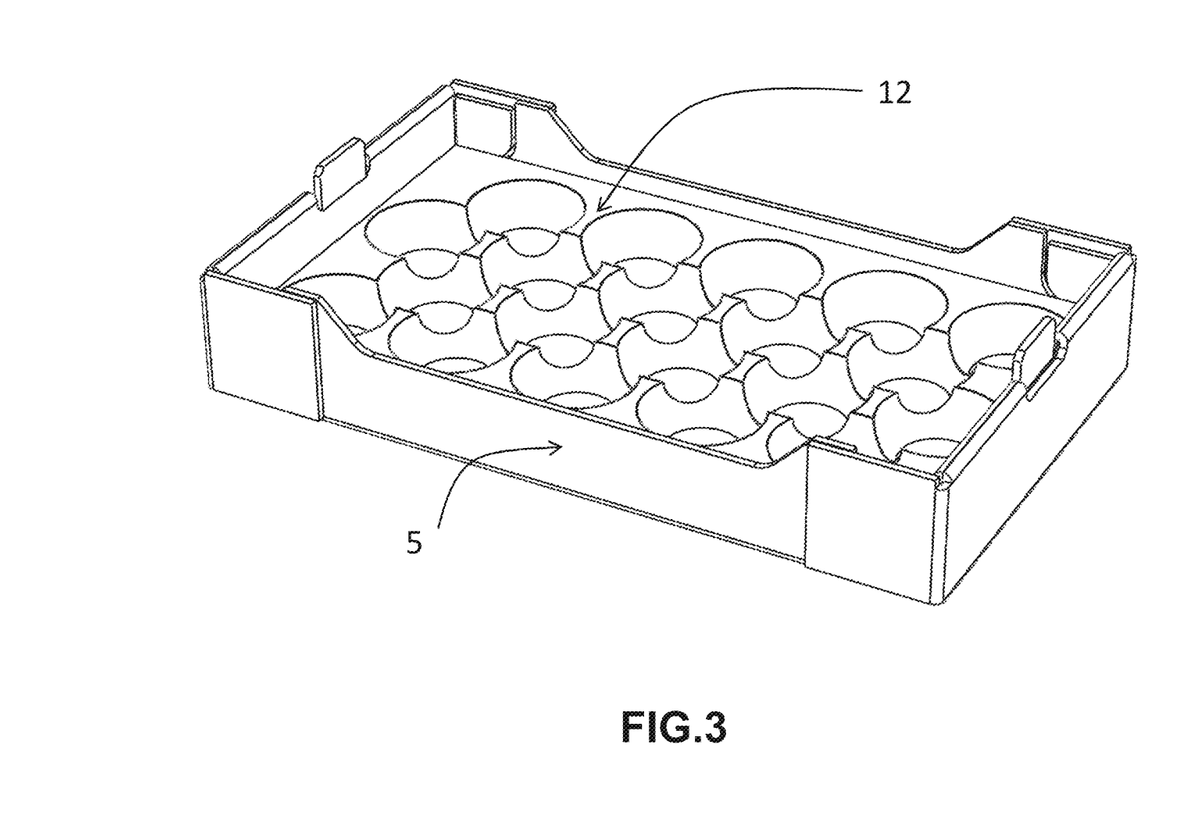
Figure 4:
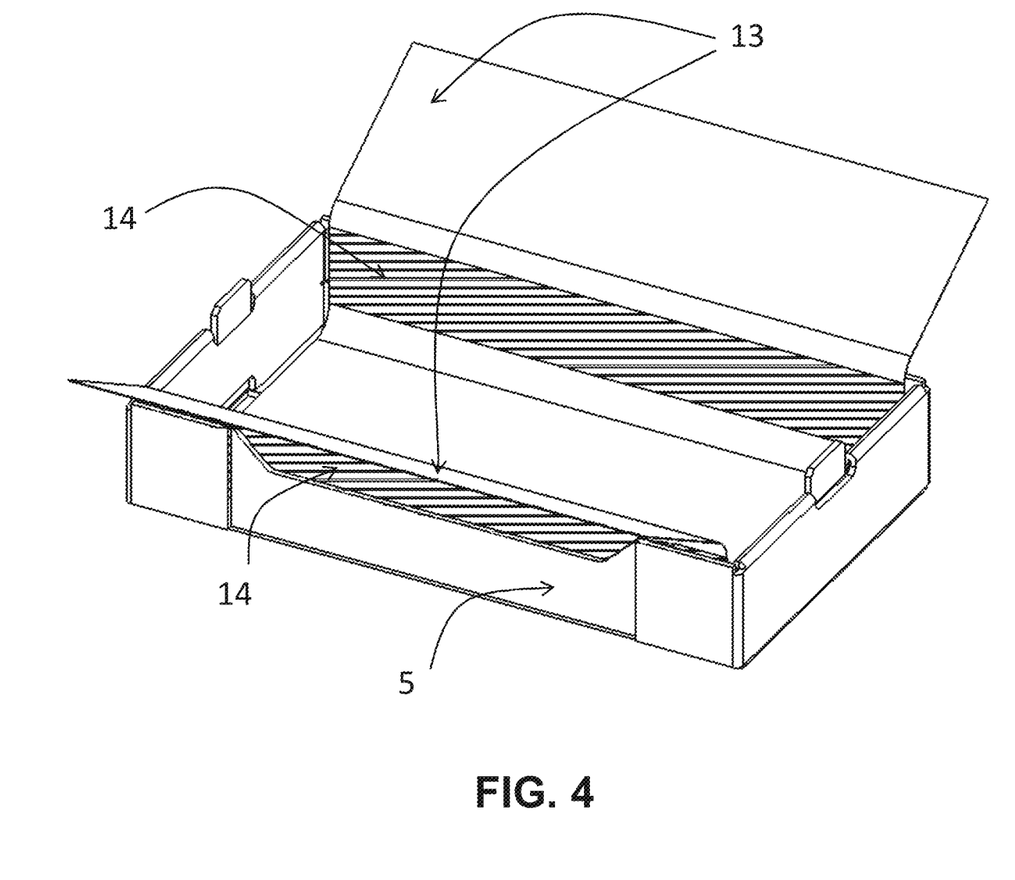
FIG. 4. Another exemplary embodiment of this invention. The cardboard box (5) has a paper or plastic sheet (13) used to wrap completely but not hermetically (above and below)
Figure 5:
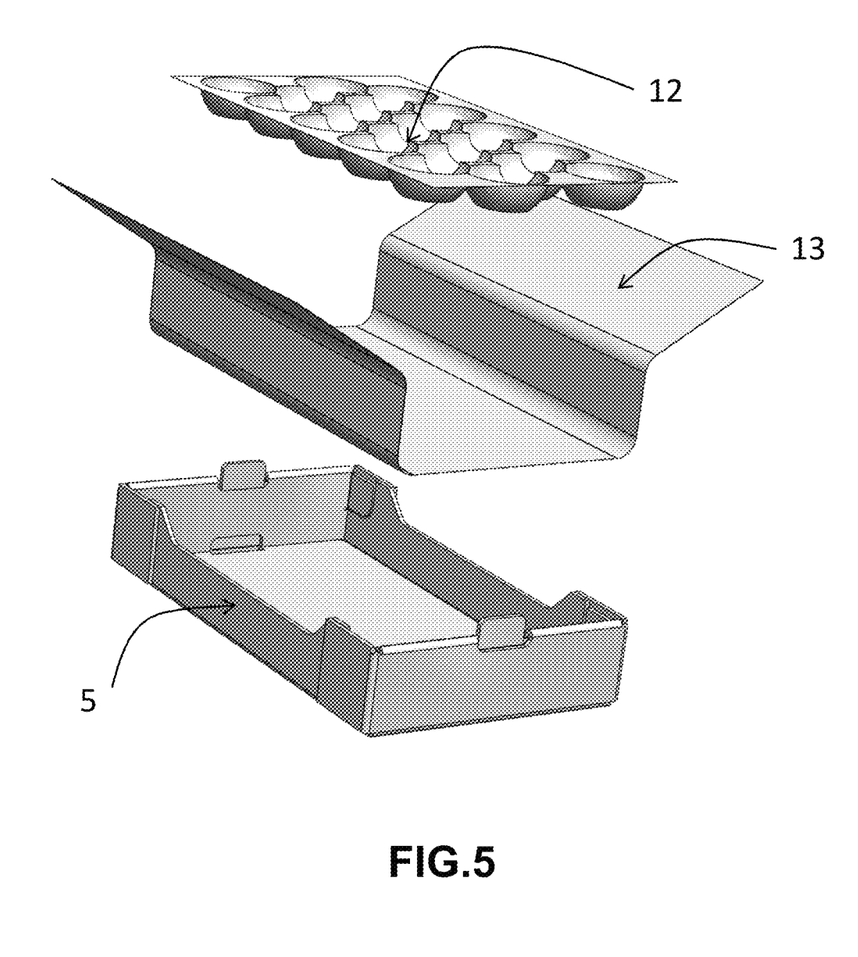
Figure 6:
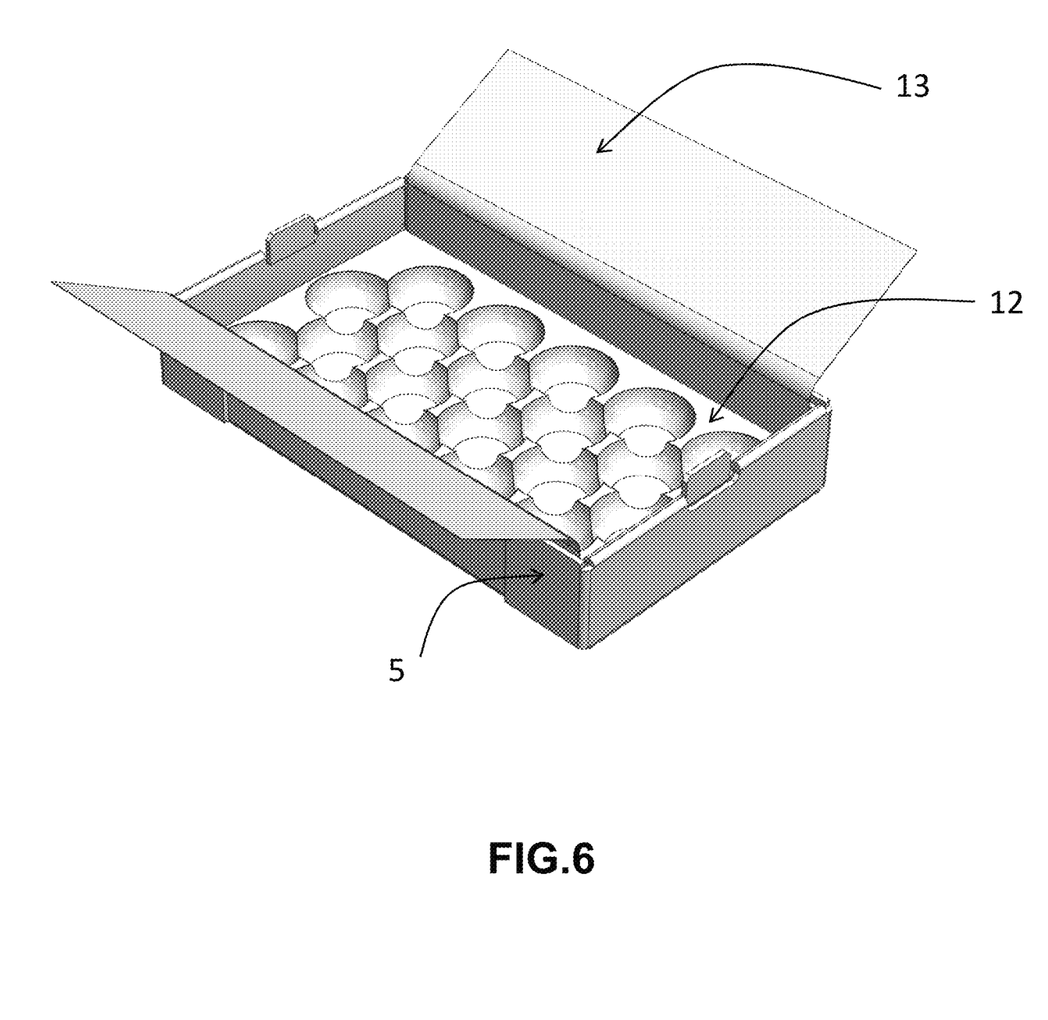
In FIG. 6 these same packaging elements (12) and (13) are seen in their place on the inside of the box (5).
Figure 7:
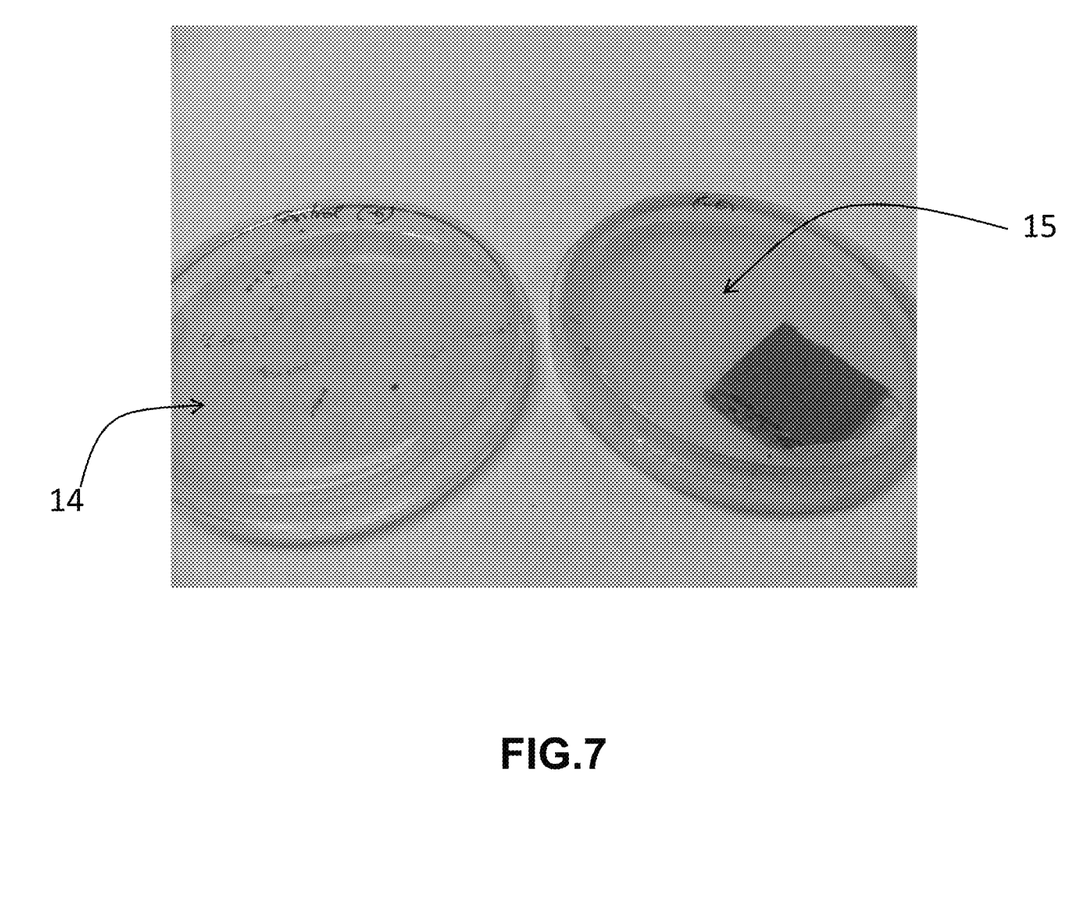

In a particular embodiment of the invention the cardboard packaging of the invention may comprise:
  a) a honeycombed shaped cavity (12) of plastic, paper or pressed cardboard for placing fruits or units of vegetables to be packed having an antimicrobial agent and/or an ethylene-adsorbent substance (see FIG. 3, 5 or 6), and/or
  b) a sheet (13) of paper or plastic material for wrapping partially or completely the units of packed fruit and vegetables having an antimicrobial agent and/or an ethylene-adsorbent substance (see FIG. 4, 5 or 6).

The method for manufacturing the aforementioned cardboard packaging for active packaging of fresh fruits and vegetables is also object of this invention, comprising:
  a) the application, on at least one of the inner faces of the packaging, of an antimicrobial coating comprising a polymeric compound and inclusion complexes of cyclodextrins with essential oils or components of these oils, or mixtures of both as an aqueous solution, emulsion, or dispersion in the ratio of 5 to 20 g/m$^2$, preferably in the ratio of 8 to 17 g/m$^2$
  b) drying of the antimicrobial coating applied in a).

In a particular and preferred embodiment of the invention, the applied antimicrobial coating has the following composition:
  Polymeric compound, in a concentration of 5 to 30% by weight, preferably of 10 to 25%;
  inclusion complexes of cyclodextrins with essential oils or components of these oils, or mixtures of both, in a concentration of 5 to 30% by weight, preferably of 10 to 25%;
  water, in a concentration of 40 to 90% by weight, preferably of 50 to 80%.

The drying of the antimicrobial coating of step b) of the method can be performed in different ways but, preferably, it is carried out by drying at a temperature between 70° C. and 180° C., preferably between 100° C. and 170° C.

As for the type of cardboard sheet to be used for manufacturing the packaging of the invention, this should preferably be of a type selected from among the following: pressed cardboard or card, of one or more layers of paper; or corrugated cardboard of one ply of flutes or single wall double face cardboard (formed by two flat faces and one fluted ply), or cardboard of two plies of flutes or double wall cardboard (formed by 3 flat faces and 2 plies of flutes) or triple wall cardboard (formed by 4 flat faces and 3 plies of flutes). The cited flute or channel of the corrugated sheet will be of the micro-flute type (flute with a height of less than 2 mm); or small flute type (flute with a height between 2.5 and 3.5 mm); or medium flute type (flute with a height between 3.6 and 4.5 mm); or a large flute (flute with height between 4.6 and 5.5 mm).

Figure 2:
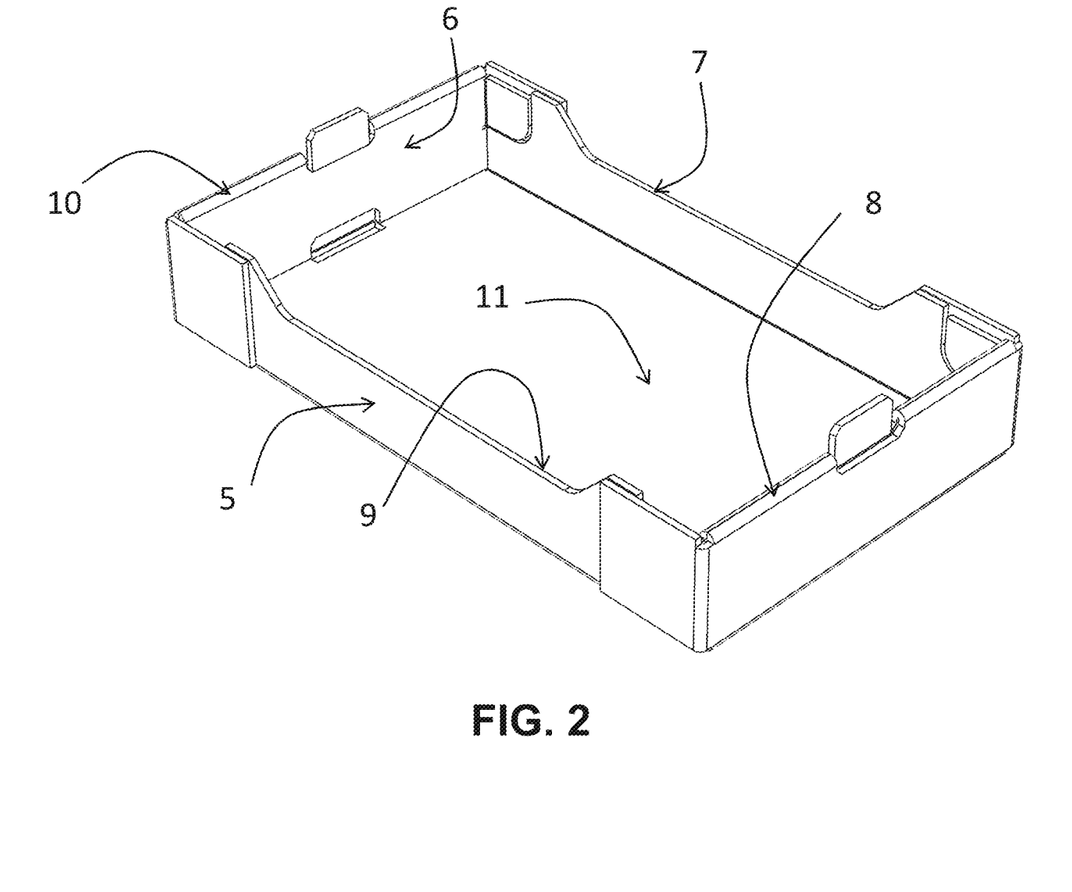

The manufacture of the packaging, object of this invention, will preferably be adapted to a packaging shape like the box shown in FIG. 2, which is stackable.

In its manufacture, the packaging may have a honeycomb shaped cavity (12) for the placement of the fruits or vegetable units to be packed. This honeycomb shaped cavity (12) may be of plastic or paper or pressed cardboard material, and preferably will include, in the same material of which the honeycomb shaped cavity is made, some type of anti-microbial agent and/or ethylene-adsorbent substance applied as a coating or according to another method. In this way, the packaging, object of this invention, will have double activity or functionality: it will be an active antimicrobial packaging and, at the same time, it can be an active packaging with ethylene adsorption properties.

In its manufacture, the cardboard packaging or box (5), object of this invention, could have a sheet (13) of paper or plastic material used to completely or partially, although not hermetically, wrap the units of fruit and vegetables packed in this box (5). This wrapping (13), which is placed inside the box (5), can be made of plastic or paper, and preferably includes some type of antimicrobial agent or ethylene-adsorbent substance, which is applied on this material as a coating or by another method. The wrapping (13) can be formed by a single sheet or more sheets that can be opened as shown in FIG. 4, and which are bonded to the sides (14) of the cited box (5).

Finally in its manufacture, the cardboard packaging, object of this invention, once loaded with the fruit or vegetable, can be wrapped in a plastic sheet through the flow-pack system, which may also include some type of antimicrobial agent or ethylene-adsorbent substance, that is applied to this material as a coating or by another method. In this way, the packaging, object of this invention, will have double activity or functionality: it will be an active antimicrobial packaging and, at the same time, it can be an active packaging with ethylene adsorption properties.

BRIEF DESCRIPTION OF THE DRAWINGS

1. The β-CD powdered sample was placed directly in the crucibles.
2. Inclusion complex formed by essential oils and β-CD, in powder form, was placed directly in the crucibles. The inclusion complex was obtained by adding the combination of essential oils to the β-CD according to an equimolecular proportion. The essential oil is a combination of essential oil of thyme and thymol in a ratio of 1:1 (volume/weight), respectively.
3. The aqueous dispersion of acrylic copolymer with the inclusion complexes formed by essential oils and β-CD was obtained by agitation of 1.5 g of the cited inclusion complex in 10 g of 15% (by weight) aqueous dispersion of acrylic copolymer. This sample was applied as a coating on a surface of stainless steel in a ratio of 12 mL/m², and dried in an oven at 70° C. for 4 seconds. The sample of the film formed, in flakes, was introduced into the crucibles.
4. The dry sample of acrylic copolymer (coating commonly used on cardboard) was obtained by applying a sample of this coating on a surface of stainless steel, in a ratio of 12 mL/m², and drying in an oven at 70° C. for 4 seconds. This sample in flakes was introduced into the crucibles.

FIG. 2. An exemplary embodiment of a packaging according to this invention. It concerns a cardboard box open at the top, and having a morphology that allows its stacking and its use in the packaging of fresh fruits and vegetables. The cardboard box (5) has an antimicrobial active coating, such as that described in this invention, and which is applied on all its inner surface (6) including the inner faces of its side walls (7), (8), (9) and (10), and on the inside of the bottom (11) of the cardboard box (5). These inner surfaces (6), with antimicrobial coating, are those which enter into contact with the fruits and vegetables that are packed in the cardboard box (5).

FIG. 3. Another exemplary embodiment of this invention. The cardboard box (5) has the antimicrobial active coating described above (as described in FIG. 2 above) applied throughout its inner surface, and it also has a honeycomb shaped cavity (12) for the placement of the fruits or vegetable units to be packed. These honeycomb shaped cavities are used so that the units of product packed do not knock each other, and so improve their appearance. This honeycomb shaped cavity may be of plastic or paper or pressed cardboard material, and may include, or not, in the same material of which it is made, some type of anti-microbial agent or ethylene-adsorbent substance, applied as a coating or according to another method on this material.

units of fruit and vegetables packed in this box (5). This wrapping (13), which is placed in the inside of the box (5), may be of plastic or paper material, and may include, or not, in the same material of which it is made, some type of anti-microbial agent or ethylene-adsorbent substance applied as a coating or according to another method on this material. This wrapper may be incomplete, and cover only the top of the box (5), and it can be formed of a single sheet or two sheets (13) that can be opened as shown in FIG. 4. In the latter case, this partial wrapper (13), which does not cover the inside of the bottom of the box (5), may be bonded to the sides (14) of the box (5).

FIG. 5. Another exemplary embodiment of this invention. The cardboard box (5) has a sheet (13) of paper or plastic material, which is used to wrap fully or partially the packed product units, as described in FIG. 4 above. And the packaging (5), object of this invention, also has a honeycomb shaped cavity (12) with the functionality and features that have been explained in FIG. 3 above. In this FIG. 5 the elements of the packaging (12) and (13) can be seen separately to better appreciate their shape and arrangement.

FIG. 7. Plate assay of the antimicrobial action of the active cardboard, object of this invention. The antimicrobial active cardboard that is shown in FIG. 7 is obtained by application of a coating based on a mixture of essential oils in the form of inclusion complexes with β-CD, and in combination with an emulsion of styrene acrylic copolymer. This cardboard coating was prepared, applied and dried as described above (FIG. 1). On the plate on the left of the picture of FIG. 7 (indicated as 14) the growth of *Escherichia coli* is shown on a control plate with a −6 dilution (in the plate assays, the plates are sown with *Escherichia coli*, at −4, −5, −6 and −7 dilutions, in triplicate; all the plates are sealed with parafilm to prevent evaporation of the essential oils). On the plate on the right of the picture (indicated as 15) it can be seen that the antimicrobial action (without contact with the medium of the plate, and only through the action of essential oils vapour released from the cardboard surface) of the cardboard, object of this invention, causes the complete inhibition of growth of this pathogen *Escherichia coli*. In similar plate assays it has been verified that this antimicrobial active cardboard, object of this invention (using a combination of essential oils of orange, bergamot and thyme, forming inclusion complexes with β-cyclodextrins) can result in a reduction of more than 2.0 log units of *Escherichia coli* and more than 2.0 log units of *Penicillium digitatum* and *Penicillium italicum*.

DESCRIPTION OF EXEMPLARY EMBODIMENTS OF THE INVENTION

Some non-exclusive embodiments of the invention are detailed below.

Exemplary, non-exclusive embodiments of the active cardboard, object of this invention, are described in FIGS. 2, 3, 4, 5, and 6.

On the one hand, a styrene acrylic copolymer emulsion is prepared, with the following properties:
Solids content, 30±1%
Viscosity at 25° C. LVT 1/60, 5-15 cps
pH 7.5-9.0
Particle size, approximately 0.06-0.2 µm
Specific weight at 25° C., 1.04 kg/L
Surfactant type, Anionic
Tg +5° C.

Permeability to water vapour of this emulsion-coated cardboard=1±0.25×10$^{-9}$ g·m/m$^2$·s·Pa. This permeability to water vapour is determined on the coated cardboard with this emulsion applied to one side of the cardboard, and after drying. In its determination the methodology of Rhim, J. W. and Kim, J. H. may be followed. (2009), "Properties of poly (lactide)-coated paperboard for the use of 1-way paper cup", Journal of food science, 74(2), E105-E111.

On the other hand, an inclusion complex of essential oils with β-cyclodextrins is prepared following the kneading method of mixing indicated by Marques (2010). The inclusion complex is obtained by adding the combination of essential oils to the β-CD according to an equimolecular proportion. The essential oil is a combination of essential oil of thyme and thymol in a ratio of 1:1 (volume/weight), respectively.

The aqueous dispersion of acrylic copolymer together with the inclusion complexes formed by essential oils and β-CD is obtained by adding and stirring a given weight of said inclusion complex (in powder form) into said aqueous dispersion of acrylic copolymer, but diluted to 15% (by weight) to achieve an aqueous dispersion with a final solids content of 30±1%.

This aqueous dispersion is applied as a coating on the surface of the cardboard, using rollers, in a ratio of 12 mL/m$^2$, and is dried in an oven at 70° C. for 30 seconds.

Below, different embodiments and application of this invention on the active packaging of fruits and vegetables are described.

Exemplary Embodiment of the Cardboard Packaging, Object of this Invention, for its Application on the Active Packaging of Fresh Lemons.

The lemons are packed in cardboard boxes, object of this invention, as that described in FIG. 2, which have a coating developed and applied as described above. The coating is applied on the face of the cardboard which comes into contact with the fresh lemons.

In this application assay of this packaging, to evidence its effectiveness as an antimicrobial active packaging, fresh lemons of the "*Verna*" variety, cultivated in the Region of Murcia (Spain) were used. The lemons were packed using two packaging systems: in cardboard boxes without active coating (Treatment called T1, in 3 kg lemon boxes), and in cardboard boxes, object of this invention, having the active coating described above (Treatment called T2, in 3 kg lemon boxes).

The lemons packed in these two types of cardboard boxes were preserved in cold storage at 8° C. and 90% relative humidity, carrying out sampling on days 0, 10, 20 and 31 of refrigerated storage. On the sampled lemons, microbiological analysis of the surface of the lemon by washing by immersion of the fruits for 1 hour in peptone water in the ratio of 1:50 (lemon:water) was performed. The results obtained are expressed in CFU (Colony Forming Units) per surface unit of the fruit. The culture medium used for determination of mould was PDA (Potato dextrose agar with 100 mg of oxytetracycline hydrate).

In this assay, it has been possible to confirm that the active packaging in the cardboard box, object of this invention, (Treatment T2) reduces the growth of mould. This makes the lemons be better preserved and undergo less decay for their shelf life. After 23 days of storage, under the conditions described above, the lemons packed in the box, object of this invention, had a fungi count of approximately 10 CFU/cm$^2$, while the lemons packed in a conventional cardboard box, without the antimicrobial active coating, object of this invention, had a surface fungi count of approximately $10^2$ CFU/cm$^2$. That is, in this application example, this type of active packaging, object of this invention, achieves a reduction of mould count on the surface of packed fruits of between 80 and 90%.

Exemplary Embodiment of the Cardboard Packaging, Object of this Invention, for its Application on the Active Packaging of Broccoli.

In this application assay of this packaging, to evidence its effectiveness as an antimicrobial active packaging, the broccoli samples used were about 200 heads of broccoli weighing about 400 g each. The samples were initially packed in polystyrene boxes, wrapped in polyethylene film with ice flakes, and the boxes were closed with a lid also of polystyrene. This type of packaging was used as a packaging control. The temperature at which the product is inside the boxes is about +2° C., and samples are preserved in cold storage at +2° C. and a relative humidity in the store air of 90%.

This type of packaging in polystyrene box, and with ice flakes, was compared to packaging in open cardboard box (of the type indicated as (5) in FIG. 4 above) with the active coating (11) of the invention and the box has a wrapping (13) at the top (of polylactic acid or PLA film), so that the pieces of broccoli are in contact with the active coating (11), but the box (5) is covered, but not hermetically, with the aforementioned PLA film. In each cardboard box 10 units of broccoli (4 kg approximately) are placed. The broccoli with the two types of packaging is preserved at 2° C. and 90% relative humidity for four weeks.

In this case, at the end of the four weeks of preservation, no differences in the microbial development on the packed product between these two packaging systems were observed. The microbial counts were very low in both cases. However, when performing the sensory analysis on the broccoli samples over their preservation period very significant differences between the two systems of packaging were observed. The broccoli samples packed in polystyrene boxes, at the end of the 28 days of preservation, were significantly more dehydrated, and had a significantly lower score on the attributes colour (3 out of 5), smell (2 out of 5), texture (3 out of 5) and overall quality (2.3 out of 5), than the broccoli samples packed in the cardboard boxes, object of this invention. The broccoli samples packed in the cardboard boxes, object of this invention, had the following scores at the end of the 28 days of preservation: colour (4.3 out of 5), smell (4 out of 5), texture (4 out of 5) and overall quality (4 out of 5).

In any case, it is evidenced that this type of active packaging according to the invention is more effective and more profitable than the packaging of broccoli in polystyrene boxes and with the use of ice flakes, since the latter packaging system is much more expensive than the packaging of the invention.

The invention claimed is:

1. A cardboard packaging for the active packaging of fresh fruits and vegetables, characterised in that the cardboard has, on at least one of the inner faces of the packaging, an antimicrobial active coating consisting essentially of:
   a polymeric compound in a concentration by weight of 5 to 30%; and
   β-cyclodextrins forming inclusion complexes with essential oils, β-cyclodextrins forming inclusion complexes with components of essential oils, or β-cyclodextrins forming inclusion complexes with mixtures of essential oils or components of essential oils in a concentration by weight of 5 to 30%; and
   water, in a weight concentration of 40 to 90%.

2. The cardboard packaging according to claim 1, characterised in that the essential oils used are pure essential oils derived from plants, wherein the plants obtained from shoots, buds, flowers, leaves, stems, branches, seeds, fruits, roots, wood, bark, or mixtures thereof.

3. The cardboard packaging according to claim 1, characterised in that the components of essential oils are terpenes, terpenoids, aromatic compounds, aliphatic compounds, mixtures thereof, or mixtures thereof with a mixture of said pure essential oils.

4. The cardboard packaging according to claim 1, characterised in that the polymer of the polymeric aqueous dispersion is anionic.

5. The cardboard packaging according to claim 1, characterised in that the polymer used is an acrylic copolymer.

6. The cardboard packaging according to claim 1, characterised in that the polymer used is a biopolymer extracted directly from biomass, a synthesized biopolymer from monomers obtained from biological material, a biopolymer directly produced by microorganisms, or derivatives thereof.

7. The cardboard packaging according to claim 1, characterised in that it further comprises:
   a) a honeycombed shaped cavity (12) of plastic, paper or pressed cardboard for placing fruits or units of vegetables to be packed having an antimicrobial agent and/or an ethylene-adsorbent substance, and/or b) a sheet (13) of paper or plastic material for wrapping partially or completely the units of packed fruit and vegetables having an antimicrobial agent and/or an ethylene-adsorbent substance.

8. The cardboard packaging according to claim 6, wherein the biopolymer extracted directly from biomass is a polysaccharide, a protein or a lipid.

9. The cardboard packaging according to claim 6, wherein the synthesized biopolymer from monomers obtained from biological material is polylactic acid or a polyester.

10. The cardboard packaging according to claim 6, wherein the biopolymer directly produced by microorganisms is polyhydroxyalkanoates, bacterial cellulose, xanthan, curdlan or pullulan.

11. A method for manufacturing a cardboard packaging according to claim 1, comprising:
   a) the application of an antimicrobial coating on at least one of the inner faces of the packaging comprising a polymeric compound and cyclodextrins forming inclusion complexes with essential oils, components of these essential oils, or mixtures of both as an aqueous solution, emulsion, or dispersion in the ratio of 5 to 20 g/m$^2$, preferably in the ratio of 8 to 17 g/m$^2$, b) drying of the antimicrobial coating applied in a).

12. The method according to claim 11, characterised in that the applied antimicrobial coating has the following composition:
   Polymeric compound, in a concentration of 5 to 30% by weight preferably of 10 to 25%;
   Inclusion complexes of cyclodextrins with essential oils or components of these oils, or mixtures of both, in a concentration of 5 to 30% by weight, preferably of 10 to 25%;
   water, in a concentration of 40 to 90% by weight, preferably of 50 to 80%.

13. The method according to claim 11, characterised in that drying is carried out at a temperature between 70° C. and 180° C., preferably between 100° C. and 170° C.

14. The method according to claim 11, characterised in that the cardboard sheet from which the active packaging is manufactured is pressed cardboard or card, of one or more layers of paper; or corrugated cardboard of one ply of flutes or single wall double face cardboard (formed by two flat faces and one fluted ply), or cardboard of two plies of flutes or double wall cardboard (formed by 3 flat faces and 2 plies of flutes) or triple wall cardboard (formed by 4 flat faces and 3 plies of flutes).

15. The method according to claim 14, characterised in that the flute of the corrugated sheet is of the micro-flute type (flute with a height of less than 2 mm); of the small flute type (flute with a height between 2.5 and 3.5 mm); of the medium flute type (flute with a height between 3.6 and 4.5 mm); of the large flute (flute with height between 4.6 and 5.5 mm).

16. The method according to claim 11, wherein the packaging has a honeycombed shaped cavity (12) of plastic material, paper or pressed cardboard for placing fruits or units of vegetables to be packed, incorporating an antimicrobial agent and/or an ethylene-adsorbent substance.

17. The method according to claim 11, wherein the packaging has a sheet (13) of paper or plastic material for wrapping partially or completely the units of packed fruit and vegetables having an antimicrobial agent and/or an ethylene-adsorbent substance.

18. The method according to claim 11, characterised in that, once loaded with fruit or vegetables, the packaging is wrapped in a plastic sheet according to the flow-pack system optionally having some type of antimicrobial agent or ethylene-adsorbent substance.

* * * * *